US006738597B1

(12) United States Patent
Jeung et al.

(10) Patent No.: US 6,738,597 B1
(45) Date of Patent: May 18, 2004

(54) REPEATING INSTALLATION USING TELEPHONE LINE

(75) Inventors: Ha-Jae Jeung, Seoul (KR); Jun-Soo Yook, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 09/720,631

(22) PCT Filed: Jun. 23, 1999

(86) PCT No.: PCT/KR99/00333

§ 371 (c)(1),
(2), (4) Date: Jul. 16, 2001

(87) PCT Pub. No.: WO99/67901

PCT Pub. Date: Dec. 29, 1999

(30) Foreign Application Priority Data

Jun. 24, 1998 (KR) .......................................... 1998-23928

(51) Int. Cl.[7] .................................................. H04B 7/15
(52) U.S. Cl. ........................ 455/11.1; 455/3.01; 455/14; 455/15; 455/16
(58) Field of Search ................................ 455/11.1, 3.01, 455/209, 14, 15, 16

(56) References Cited

U.S. PATENT DOCUMENTS 5,765,099 A    6/1998   Georges et al. ................ 455/14
5,774,789 A  * 6/1998   van der Kaay et al. ........ 455/16
6,157,810 A  * 12/2000  Georges et al. ............ 455/11.1

FOREIGN PATENT DOCUMENTS

| CN | 1148312 A | 9/1996 | |
| JP | 09-200839 | 7/1997 | |
| JP | 09200839 | 7/1997 | ............ H04Q/7/36 |
| WO | WO 97/22186 | 6/1997 | |
| WO | WO 97 22186 | 6/1997 | ............ H04B/3/50 |

* cited by examiner

*Primary Examiner*—Quochien B. Vuong
*Assistant Examiner*—Alan T. Gantt
(74) *Attorney, Agent, or Firm*—Blakely, Sokoloff, Taylor & Zafman

(57) ABSTRACT

A repeating apparatus of the present invention converts a data signal from the mobile switching center to an intermediate frequency signal and transfers the intermediate frequency signal to an unused telephone line and a dedicated line network. The apparatus converts the intermediate frequency signal transferred through the unused telephone line and the dedicated line network to the data signal frequency signal and transfers the data signal to the mobile switching center. In the present invention, the intermediate frequency signal is transferred between a mother station and at least one first child station through the unused telephone line and the intermediate frequency signal is modulated to transfer between the mother station and at least one second child station through the dedicated line network.

11 Claims, 2 Drawing Sheets

REPEATING INSTALLATION USING TELEPHONE LINE

FIELD OF THE INVENTION

The present invention relates to a repeating apparatus for use in a CDMA (Code Division Multiple Access) communications system, and, more particularly, to a repeating apparatus for providing call service to a mobile telephone located within a shadow area such as a building and a underpass by using a telephone line within the building and a dedicated line (e.g., underground telephone line) connected to a dedicated line network.

PRIOR ART OF THE INVENTION

Generally, a telephone line currently used seems improper to bandwidth communications, e.g., CDMA (Code Division Multiple Access) communications, because of its high RF transmission loss and non-uniform characteristics.

Furthermore, conventionally, when a mobile phone such as cellular phone or a PCS phone using the CDMA technique is located at a shadow area like a building or a underpass, an optical cable or a RF coaxial cable within the building is used to repeat a communication signal.

However, in the conventional method, the expensive optical cable or a RF coaxial cable is required, it costs much. Especially, if the optical cable or the RF coaxial cable for providing the call service to the mobile phone is not installed initially within the building, interior of the building may be disassembled to install the optical cable or the RF coaxial cable so that manpower and time could give rise to a problem.

SUMMARY OF THE INVENTION

Therefore, it is an object of the present invention to provide a repeating apparatus for providing call service to a mobile telephone positioned within a shadow area like a building by using a telephone line within the building.

And, it is another object of the present invention to provide a repeating apparatus for providing call service of high quality to a mobile telephone and preventing a call drop during a call by transmitting, via a dedicated line connected to a dedicated line network, a high power signal to a local shadow area out of a building at which a mother station is positioned.

In accordance with an aspect of the present invention, there is provided a repeating apparatus including: at least one first and second child stations; and a mother station within a base station, wherein, depending on a synchronization signal generated by a synchronization signal generator in the base station, the mother station combines data signals transferred from a mobile switching center to generate an intermediate frequency signal to transfer to an unused telephone line; and converts the intermediate frequency signal transferred through the unused telephone line to a baseband signal to transfer to the mobile switching center, and the intermediate frequency signal is transceived through the unused telephone line between the mother station and at least one first child station.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

Figure 1:
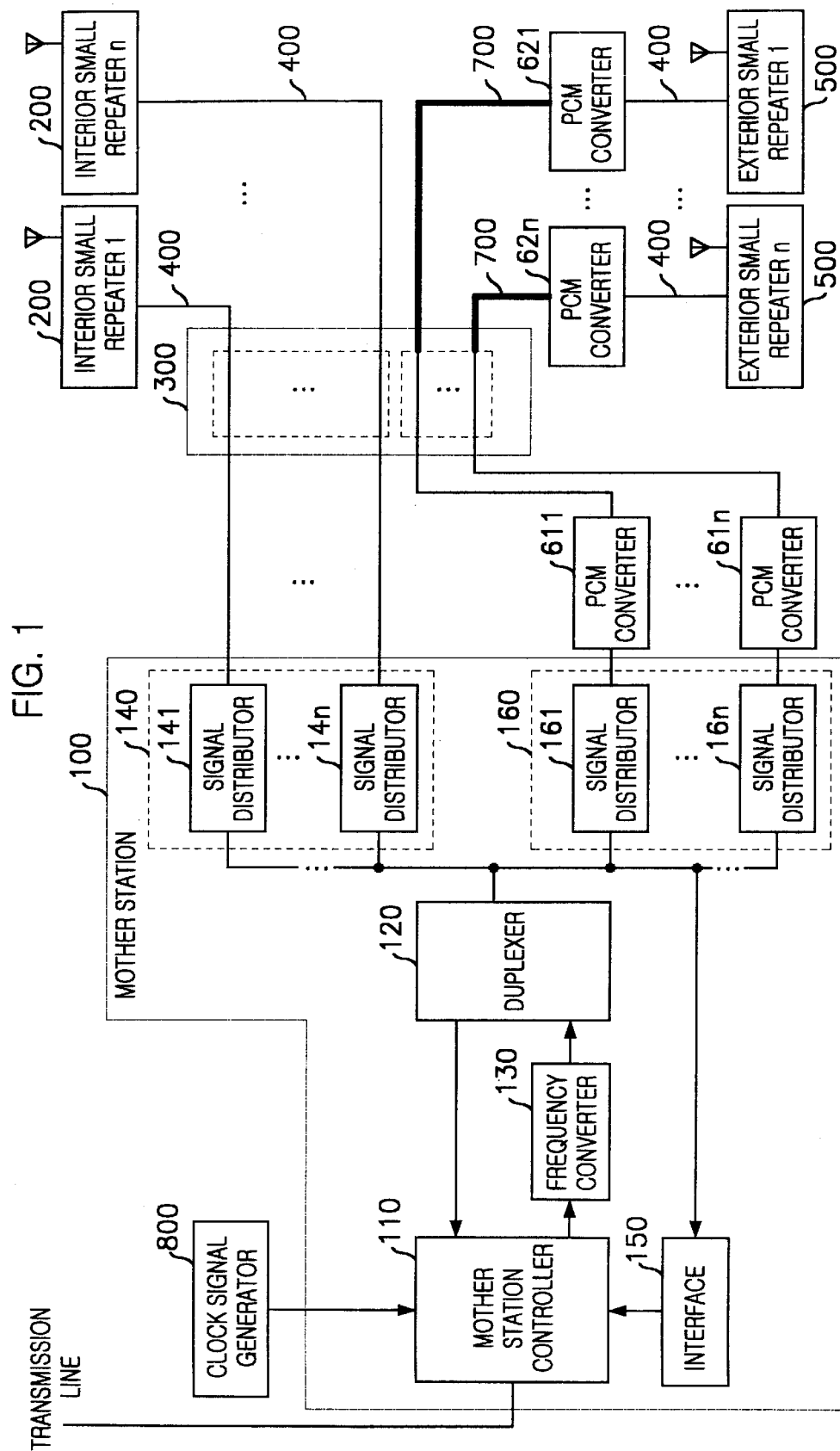
FIG. 1 is a diagram illustrating an embodiment of a repeating apparatus using a telephone line in accordance with the present invention.

FIG. 1 is a diagram illustrating an embodiment of a repeating apparatus using a telephone line in accordance with the present invention.

Referring to FIG. 1, the repeating apparatus of the present invention is positioned within a base station, in particular, in a communication chamber within a building, which includes a mother station 100 for transceiving a RF (Radio Frequency) signal, a multiplicity of interior small repeaters 200 for transferring an intermediate frequency signal from the mother station 100 to a mobile phone located within the building and transferring the intermediate frequency signal from the mobile phone to the mother station 100, a plurality of exterior small repeaters 500 for transferring the intermediate frequency signal from the mother station 100 to a mobile phone out of the building and transferring the intermediate frequency signal from the mobile phone out of the building to the mother station 100, a signal connection board 300 positioned at the communication chamber within the building and coupled between the mother station 100 and the plurality of the interior small repeaters 200 and the exterior small repeaters 500 for connecting signals, PCM (Pulse Coded Modulation) converters 611 to 61n) for converting a PCM signal from the signal connection board 300 to the intermediate frequency signal to transfer to the mother station 100 and converting the intermediate frequency signal from the mother station 100 to the PCM signal to transfer to the signal connection board 300, and PCM converters 621 to 62n for converting one of the intermediate frequency signal and an audio signal from the exterior small repeater 500 to the PCM signal to transfer to the signal connection board 300 and converting the PCM signal from the signal connection board 300 to the RF signal to transfer to the exterior small repeater 500. Herein, the multiplicity of the interior small repeaters 200 and the signal connection board 300 are connected through a twisted wire 400 and the plurality of the exterior small repeaters 500 and the PCM converters 621 to 62n are connected, respectively, through a dedicated line 700.

Herein, since the dedicated line 700 used for connection to the exterior small repeaters 500 can transceive a digitalized signal like the PCM signal, the signal transferred through the dedicated line is made to the PCM signal at the PCM converters 611 to 61n.

And, the mother station 100 of the repeating apparatus, includes a mother station controller 110 for transferring a signal received from the outside, transferring signals from the interior small repeaters 200 and exterior small repeaters 500 to the outside and for checking operation state of the interior small repeaters 200, a duplexer 120 for transferring the intermediate frequency signal in high frequency bandwidth, e.g., in 4.95 MHz received through signal distributor blocks 140 and 160, a frequency converter 130 for converting the intermediate frequency signal in high frequency bandwidth from the mobile station controller 110 to the intermediate frequency signal in low frequency bandwidth, e.g., in 1.95 MHz, to transfer to the duplexer 120, a signal distributor block 140 for distributing the signal from the duplexer 120 to the signal connection board 300 and distributing the signal from the signal connection board 300 to the duplexer 120 and an interface 150, a signal distributor block 160 for distributing the signal from the duplexer 120 to a corresponding one of the PCM converters 611 to 61n and distributing the signals from the PCM converters 611 to 61n to the duplexer 120 and the interface 150, the interface 150 for transferring operation state monitoring signals, for the interior and exterior small repeaters 200 and 500, distributed by the signal distributor blocks 140 and 160, to the mobile station controller 110.

Herein, the intermediate frequency signal among the signals distributed by the signal distributor blocks 140 and 160 is transferred to the mobile station controller 110 via the duplexer 120. The audio signal, i.e., the operation state monitoring signals for the small repeaters, are transferred to the mobile station controller 110 via the duplexer 120.

The mobile station 100 transmits a transmission signal generated at the base station by using low bandwidth of the telephone line 400 and transmits the signals generated at the interior and exterior repeaters 200 and 500 by using high bandwidth of the telephone line 400.

The signal distributor block 140 used for signal connection to the interior small repeaters 200 includes a plurality of signal distributors 141 to 14n, each connected to the corresponding one of the interior small repeaters 200.

On the other hand, since the interior small repeaters 200 are able to transceive the signal only within a particular area of the building, the number of the interior small repeaters 200 depends on size of the building. That is, the larger the building is, the more the interior small repeaters 200 are required. On the contrary, the smaller the building is, the less the interior small repeaters 200 are required.

And, since the PCM is used for connection to the dedicated line, signal connection can be performed between the exterior small repeaters 500 and the mother station 100 even if their distance is longer than 300 m.

Hereinafter, it will be described in detail for operation of the repeating apparatus of the present invention using the telephone line and the dedicated line network as described above.

At first, it will be discussed the procedure of signal transmission from the mobile station to the small repeaters.

When a data signal is transferred from the mobile switching center connected to the mother station through a transmission line, the mother station controller 110, depending on a synchronization signal generated by a synchronization signal generating unit in the base station, composites the data signal with a CDMA (Code Division Multiple Access) technique and generates the intermediate frequency signal. The intermediate frequency signal of 4.95 MHz is converted to the intermediate frequency signal of 1.95 MHz at the frequency converter 130 to be transferred to the duplexer 120.

And then, the converted intermediate frequency signal is transferred to the signal distributor blocks 140 and 160 via the duplexer 120 to be distributed by the signal distributor blocks 140 and 160.

The intermediate frequency signal distributed by the signal distributor block 140 used for interior is transferred to the corresponding one of the interior small repeaters 200 through the signal connection board 300 and the telephone line 400.

On the other hand, the intermediate frequency signal distributed by the signal distributor block 160 used for exterior is converted to the PCM signal by the corresponding one of the PCM converters 611 to 61n and then transferred to the corresponding one of the PCM converters 621 to 62n through the signal connection board 300 and the telephone line 400.

Through the procedure described above, the data signal is transferred to the mobile phone near the interior and exterior small repeaters 200 and 500.

Next, it will be discussed the procedure for transferring the signal from the small repeater to the mother station.

When the high frequency signal is transferred from the mobile phone near the interior and exterior small repeaters 200 and 500 to the interior and exterior small repeaters 200 and 500, the interior small repeaters 200 convert the high frequency signal to the intermediate frequency signal to transfer to the signal distributor block 140 through the telephone line 400 and the signal connection board 300.

On the other hand, the exterior small repeaters 500 convert the high frequency signal to the intermediate frequency signal to transfer to the corresponding one of the PCM converters 611 to 61n through the telephone line 400 and the signal connection board 300. The corresponding one of the PCM converters 611 to 61n converts the intermediate frequency signal to the PCM signal to transfer to the corresponding one of the PCM converters 621 to 62n through the dedicated line 700 and the signal connection board 300. And then, the corresponding one of the PCM converters 621 to 62n converts the PCM signal to the intermediate frequency signal to transfer to the signal distributor block 160.

As described above, the intermediate frequency signals transferred to the signal distributor blocks 140 and 160 of the mother station 100 are transferred to the mother station controller 110 via the duplexer 120.

And then, depending on the synchronization signal from the synchronization signal generating unit 800, the mother station controller 110 converts the intermediate frequency signal from the duplexer 120 to the baseband signal, demodulates the baseband signal by using the CDMA technique of a corresponding channel and transfers the demodulated signal to the mobile switching center.

On the other hand, the interior and exterior small repeaters 200 and 500 monitor the operation states themselves and the operation state monitoring signals are also transferred to the mother station 100 by using the above procedure.

Since the operation state monitoring signal outputted from the interior and the exterior small repeaters 200 and 500 are the audio frequency signals, they are transferred after distributed at the signal distributor blocks 140 and 160 to the mother station controller 110 via the interface 150 without passing the duplexer 120.

Therefore, the mother station controller 110 can determines whether the interior and the exterior small repeaters 200 and 500 are operate normally by using the operation state monitoring signals transferred as described above.

Figure 2:
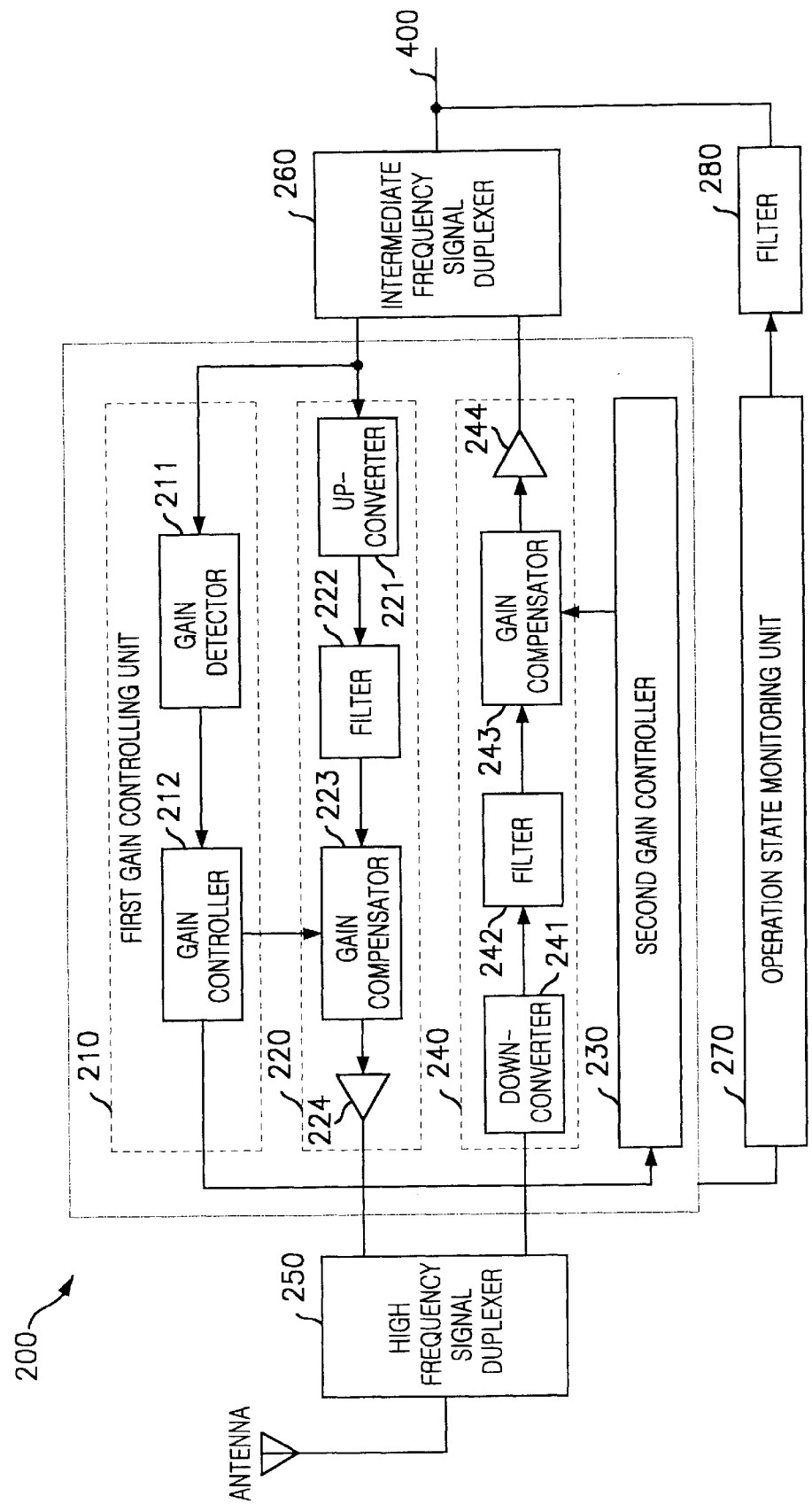
FIG. 2 shows a block diagram of an embodiment of a small repeater in accordance with the present invention.

FIG. 2 shows a block diagram of an embodiment of the small repeater in accordance with the present invention.

As shown in FIG. 2, the small repeater of the present invention includes a first gain controlling unit 210 for detecting gain loss of the intermediate frequency signal transferred from the mother station 100 and providing a gain control signal for compensate the gain loss, a up-converting unit 220 for up-converting the intermediate frequency signal from the mother station 100 to the high frequency signal and compensating the gain of the high frequency signal depending on the gain control signal from the first gain controlling unit 210, a second gain controlling unit 230 for estimating, depending on the gain control signal from the first gain controlling unit 220, the gain loss induced to a signal during transmission from outside to the mother station 100 through the telephone line 400 and provide a gain control signal to compensate gain of a received signal, a down-converting unit 240 for down-converting the high frequency signal from the outside to the intermediate frequency signal and compensate the gain of the intermediate frequency signal depending on the gain control signal from the second gain controlling unit 230 to transfer to the mother station 100, a high frequency signal duplexer 250 for transferring the high frequency signal from the up-converting unit 220 to the mobile phone within the building via an antenna and transferring the high frequency signal transferred from the mobile phone within the building via the antenna to the down-converting unit 240, an intermediate frequency duplexer 260 for transferring the intermediate frequency signal from the mother station 100 to the down-converting unit 240 and transferring the intermediate frequency signal from the down-converting unit 240 to the mother station 100, an operation state monitoring unit 270 for monitoring the operation state of the first gain controlling unit 210, the up-converting unit 220, the second gain controlling unit 230 and the down-converting unit 240, and a filter 280 for filtering a detection signal of frequency bandwidth of the audio signal from the operation state monitoring unit 260 to transfer to the mother station 100.

The first gain controlling unit 210 includes a gain detector 211 for detecting the gain loss of the intermediate frequency signal from the mother station 100, and a gain controller 212 receiving the gain loss for providing the up-converter 220 and the second gain controller 230 with the gain control signal to compensate the gain loss.

The up-converting unit 220 includes a up-converter 221 for up-converting the intermediate frequency signal from the mother station 100 to the high frequency signal, a filter 222 for filtering the high frequency signal from the up-converter 221, a gain compensator 223 for compensating, depending on the gain control signal from the gain controller 212, the gain of the high frequency signal from the filter 222, and an amplifier 224 for amplifying the high frequency signal from the gain compensator 223 to transfer to the high frequency signal duplexer 250.

The down-converting unit 240 includes a down-converter 241 for down-converting the high frequency signal from the high frequency signal duplexer 250 to the intermediate frequency signal, a filter 242 for filtering the intermediate frequency signal from the down-converter 241, a gain compensator 243 for compensating, depending on the gain control signal from the gain controller 212, the gain of the intermediate frequency signal from the filter 242, and an amplifier 244 for amplifying the intermediate frequency signal from the gain compensator 243 to transfer to the intermediate frequency signal duplexer 260

Hereinafter, it will be described in detail for the operation of the small repeater in accordance with the present invention.

At first, it will be discussed the procedure of transmitting the signal transferred from the mobile station via the antenna.

When the intermediate frequency signal is transferred from the mother station 100 to the interior and the exterior small repeaters 200 and 500 through the telephone line 400, the intermediate frequency signal duplexer 260 transfers the intermediate frequency signal from the mother station 100 to the first gain controlling unit 210 and the up-converting unit 220. The gain detector 211 of the first gain controlling unit 210 detects the gain loss induced to the intermediate frequency signal transferred via the intermediate frequency signal duplexer 260 during transmission through the telephone line and transfers the detected gain loss to the gain controller 212. The gain controller 212 receives from the gain controller 212 the gain loss induced to the intermediate frequency during transmission through the telephone line and transfers the gain control signal to compensate the gain loss of the intermediate frequency signal to the gain compensator 223 of the up-converting unit 220 and the second gain controlling unit 230. And the up-converter 221 of the up-converting unit 220 up-converts the intermediate frequency signal from the intermediate frequency signal duplexer 260 to the high frequency signal by matching to an ultrashort modulation frequency from an ultrashort modulation frequency generator (not shown) and transfers the up-converted high frequency signal to the filter 222. The up-converter 221 also transfers the intermediate frequency signal and the ultrashort modulation frequency to the filter 222.

The filter 222 of the up-converting unit 220 filters the signals from the up-converter 221 to eliminate the intermediate frequency signal and the ultra modulation frequency and extract the high frequency signal of the frequency bandwidth transferred through the telephone line to transfer to the gain compensator 223. Subsequently, the gain compensator 223 compensates, depending on the gain control signal from the gain controller 212, the high frequency signal from the filter 222 to transfer to the amplifier 224. The amplifier 224 amplifies the high frequency signal from the gain compensator 223 enough to transfer to the mobile phone and transfers the amplified signal to the high frequency signal duplexer 250. The high frequency signal transferred to the high frequency duplexer 250 is transferred to the mobile phone via the antenna.

Next, it will be discussed the procedure of transmitting the signal received via the antenna.

When the high frequency signal is transferred from the mobile phone to the high frequency signal duplexer 250 via the antenna, the down-converter 241 of the down-converting unit 240 down-converts the high frequency signal from the high frequency signal duplexer 250 to the intermediate frequency signal to transfer to the filter 242. The down-converter 241 down-converts the high frequency signal from the high frequency signal duplexer 250 to the. intermediate frequency signal by matching to the ultrashort modulation frequency from the ultrashort modulation frequency generator (not shown) transfers to transfer to the filter 242 along with the high frequency signal and the ultrashort modulation frequency.

And then, the filter 242 of the down-converting unit 240 filters the signal from the down-converter 241 to eliminate the high frequency signal and the ultra modulation frequency and extract the intermediate frequency signal to transfer to the gain compensator 243.

As described above, the gain compensator 243 compensates, depending on the gain control signal from the second gain controlling unit 230, the intermediate frequency signal from the filter 242 to transfer to the amplifier 224. The second gain controlling unit 230 estimates the gain loss induced to the intermediate frequency signal from the down-converter 240 to the mother station 100 by using the gain control signal from the gain controller 212 and generates the gain control signal to compensate the gain of the intermediate frequency signal from the filter 242 by the estimated gain loss to provide to the gain compensator 243.

Subsequently, the amplifier 244 of the down-converter 240 amplifies the intermediate frequency signal from the gain compensator 243 enough to transfer to the mother station 100 and transfers the amplified signal to the intermediate frequency signal duplexer 260. The intermediate frequency signal transferred from the amplifier 244 is transferred to the mother station 100 via the intermediate frequency duplexer 260.

On the other hand, the operation state monitoring unit 270 checks whether the first gain controlling unit 210, the up-converting unit 220, the second gain controlling unit 230 and the down-converting unit 240 operate normally and transfers the operation state monitor signal to the filter 280 by using the audio frequency bandwidth. Subsequently, the filter 280 filters the operation state monitor signal of the audio frequency bandwidth from the operation state monitoring unit 270 and transfers the extracted direct current signal proper to the mother station 100 or the audio frequency signal through the telephone line 400 to the mother station 100.

And the present invention as described above performs the procedure as described above in transceiving to/from the mobile phone located at the outside.

As described above, the present invention repeats transmission to/from the mobile phone by using the small repeaters connected to the mother station positioned within the building through the telephone line and by using the small repeaters at the shadow area out of the building in which the mother station is located.

The present invention can provides the mobile phone at the shadow area such as the building or the underpass with a call service of high quality without disturbance.

The present invention can prevent call drop by transmitting high power signal into the local shadow area such as the building or the underpass by using the small repeaters connected to the telephone line installed within inside of the building.

Comparing the conventional optical cable or the RF coaxial cable, the present invention can be easily installed and reduces cost by connecting the small repeater for the call service to the pre-installed telephone line.

Because the present invention utilizes the pre-installed telephone line as a CDMA repeating line, installation cost for the optical cable and the RF coaxial cable can be reduced significantly.

In the present invention, the low frequency bandwidth of the telephone line at which transmission loss is relatively low is assigned to the base station transmitting signal that can be outputted at all time. The high frequency bandwidth is assigned to the base station receiving signal since it is able to demodulate a weak signal in the CDMA technique and the distance between the mobile phone and the repeating apparatus is short so that a strong signal can be transmitted. Therefore, the present invention can utilizes the telephone line as a CDMA repeating line.

While the present invention has been shown and described with respect to the particular embodiments, it will be apparent to those skilled in the art that many changes and modifications may be made without departing from the spirit and scope of the invention as defined in the appended claims.

What is claimed is:

1. A repeating apparatus comprising:

a mother station within a base station; and at least one first and second child stations, wherein the mother station mixes a data signal from a mobile switching center to generate an intermediate frequency signal to transfer to a unused telephone line and converts the intermediate frequency signal transferred through the telephone line to a baseband signal to transfer to the mobile switching center, depending on a synchronization signal generated by a synchronization signal generating means in the base station, and the intermediate frequency signal is transferred between the mother station and the at least one first child station through the unused telephone line, wherein the mother station mixes the data signal from the mobile switching center to generate the immediate frequency signal to transfer through a dedicated line network and converts the intermediate frequency signal transferred through the dedicated line network to the baseband signal to transfer to the mobile switching center, depending on the synchronization signal generated by the synchronization signal generating means in the base station, and the intermediate frequency signal is modulated to transfer between the mother station and the at least one second child station through the dedicated line network, wherein the mother station includes:

a controlling means for composting the data signal from the mobile switching center with a code division multiple access technique to generate the intermediate frequency signal to transfer through the dedicated line network, converting the intermediate frequency signal transferred through the dedicated line network to the baseband signal and demodulating the baseband signal with the code division multiple access technique for each channel to transfer to the mobile switching center;

a frequency converting means for converting the frequency of the intermediate frequency signal to a lower frequency;

a signal transferring means for transferring the intermediate frequency signal converted by the frequency converting means to the controlling means; and a signal distributing means for distributing the intermediate frequency signal transferred via the signal transferring means to transfer through the unused telephone line and the dedicated line network and distributing the intermediate frequency signal received through the phone line and the dedicated line network to transfer to the signal transferring means, wherein a signal generated at the base station is transferred by using low frequency bandwidth of the telephone line and signal generated to the first and the second child stations are transferred by using high frequency bandwidth of the telephone line.

2. The apparatus as recited in claim 1, wherein the mother station further includes:

a signal connecting means for connecting operation state monitoring signals corresponding to the at least one first and second child stations distributed by the signal distributing means to the controlling means, wherein the mother station detects operation failure of the at least one first and second child stations by using the operation state monitoring signals from the signal connecting means.

3. The apparatus as recited in claim 2, wherein the operation state monitoring signals for the at least one first and second child stations are audio frequency signals that are not transferred via the signal transferring means but transferred via the signal connecting means.

4. The apparatus as recited in claim 1, 2 or 3, further comprising:

a signal coupling means connected to the telephone line and the dedicated line network for coupling signals between the mother station and the at least one first and second child stations;

at least one first PCM (Pulse Coded Modulation) converting means for converting a PCM signal transferred from the signal coupling means to the intermediate frequency signal and the operation state monitoring signals to transfer to the mother station and converting the intermediate frequency signal transferred from the mother station to the PCM signal to transfer to the signal coupling means; and at least one second PCM converting means for converting the intermediate frequency signal and the operation state monitoring signal transferred from the at least one second child station to the PCM signal to transfer to the signal coupling means and for converting the PCM signal transferred from the signal coupling means to the intermediate frequency signals to transfer through the unused telephone line to the at least one second child station.

5. The apparatus as recited in claim 4, wherein the at least one first child station is disposed at a shadow area of inside of a building in which the mother station is located, and the at least one second child stations is disposed at a shadow area of outside of the building connected to the dedicated line network.

6. The apparatus as recited in claim 1, wherein each of the at least one first and second child stations includes:

a first gain controlling means for detecting gain loss of the intermediate frequency signal transferred from the mother station to generate a first gain control signal for compensating the gain loss of the intermediate frequency signal;

a up-converting means for up-converting the intermediate frequency signal transferred from the mother station to a high frequency signal and compensating, depending on the first gain control signal, the gain of the high frequency signal up-converted to transfer to outside;

a second gain controlling means for estimating gain loss induced to a received signal from the outside during transmission to the mother station through the unused telephone line and the dedicated line network by using the first gain control signal transferred from the first gain controlling means to generate a second gain control signal for compensating the gain loss of the received signal; and a down-converting means for down-converting the high frequency signal transferred from the outside to the intermediate frequency signal and compensating, depending on the first gain control signal, the gain of the intermediate frequency signal down-converted to transfer to the mother station.

7. The apparatus as recited in claim 6, further comprising:

a first duplexer for transferring the high frequency signal transferred from the up-converting means to the outside and transferring the high frequency signal transferred from the outside to the up-converting means; and a second duplexer for transferring the intermediate frequency signal transferred through the telephone line and the dedicated line network to the down-converting means and transferring the intermediate frequency signal transferred from the down-converting means to the telephone line and the dedicated line network.

8. The apparatus as recited in one of claims 6 and 7, further comprising:

an operating state monitoring means for monitoring operation states of the first gain controlling means, the up-converting means, the second gain controlling means and the down-converting means; and a first filtering means for filtering the monitoring signal of the audio frequency bandwidth transferred from the operation state monitoring means and transferring the filtered signal to the telephone line and the dedicated line network.

9. The apparatus as recited in claim 8, wherein the first gain controlling means includes:

a gain detector for detecting the gain loss of the intermediated frequency signal transferred through the telephone line and the dedicated line network; and a gain controller receiving the detected gain loss from the gain detector for providing the up-converting means and the first gain controlling means with the first gain controlling signal to compensate the gain loss of the intermediate frequency signal.

10. The apparatus as recited in claim 9, wherein the up-converting means includes:

a up-converter for up-converting the intermediate frequency signal transferred from the telephone line and the dedicated line network to the high frequency signal;

a second filtering means for filtering the high frequency signal up-converted by the up-converter to extract a signal of a first predetermined bandwidth to be transferred;

a first gain compensating means for compensating, depending on the first gain control signal transferred from the gain controlling means, the gain of the signal extracted by the second filtering means; and a first amplifying means for amplifying the gain compensated high frequency signal from the first gain compensating means and transfer the amplified high signal to the first duplexer.

11. The apparatus as recited in claim 10, wherein the down-converting means includes:

a down-converter for down-converting the high frequency signal transferred via the first duplexer to the intermediate frequency signal;

a third filtering means for filtering the intermediate frequency signal down-converted by the down-converter to extract a signal of a second predetermined bandwidth to be transferred;

a second gain compensating means for compensating, depending on the second gain control signal transferred from the second gain controlling means, the gain of the signal extracted by the third filtering means; and a second amplifying means for amplifying the gain compensated intermediate frequency signal from the second gain compensating means and transfer the amplified intermediate signal to the second duplexer.

* * * * *